United States Patent [19]

Brock et al.

[11] Patent Number: 5,401,795
[45] Date of Patent: Mar. 28, 1995

[54] WATER-BASED PHYSICALLY DRYING COATING AGENTS, MANUFACTURE AND USE THEREOF

[75] Inventors: Thomas Brock, Hürth; Hans-Peter Patzschke, Wuppertal; Fritz Sadowski, Pulheim, all of Germany

[73] Assignee: Herberts Gesellschaft mit Beschrankter Haftung, Wuppertal, Germany

[21] Appl. No.: 49,616

[22] Filed: Apr. 19, 1993

Related U.S. Application Data

[63] Continuation of Ser. No. 877,534, May 1, 1992, abandoned.

[30] Foreign Application Priority Data

May 8, 1991 [DE] Germany .................. 41 15 042.2

[51] Int. Cl.$^6$ .............................................. C08L 75/06
[52] U.S. Cl. .................................... 524/539; 523/402; 523/415; 524/507; 524/591; 524/839; 524/840; 525/113; 525/123; 525/454; 525/455
[58] Field of Search ............ 523/412, 402, 415; 524/458, 460, 507, 539, 591, 839, 840; 525/454, 455, 113, 123

[56] References Cited

U.S. PATENT DOCUMENTS

| | | | |
|---|---|---|---|
| 4,684,676 | 8/1987 | Diefenbach et al. | 524/458 |
| 4,908,397 | 3/1990 | Barsotti et al. | 525/113 |
| 4,954,559 | 9/1990 | Den Hartog et al. | 524/507 |
| 5,006,413 | 4/1991 | Den Hartog et al. | 524/507 |
| 5,057,555 | 10/1991 | White et al. | 525/113 |
| 5,066,733 | 11/1991 | Martz et al. | 525/458 |
| 5,068,153 | 11/1991 | Barsotti et al. | 525/113 |
| 5,087,647 | 2/1992 | Flakus | 523/412 |
| 5,096,954 | 3/1992 | Yamada et al. | 524/458 |

Primary Examiner—John Kight, III
Assistant Examiner—John M. Cooney, Jr.
Attorney, Agent, or Firm—Fitch, Even, Tabin & Flannery

[57] ABSTRACT

The description relates to a physically drying water-based coating agent. It contains water, pigments, neutralizing agents, conventional additives, small proportions of solvents and a binder mixture consisting of A) 10 to 90 wt. % polyurethanes with carbonate groupings and a glass transition temperature of <0° C. based on reaction products of polyisocyanates with polyhydroxyl compounds, with a content of polyhydroxy polycarbonates and B) 90 to 10 wt. % of reaction products of carboxyfunctional polycondensates and α,β-olefinically unsaturated monomers with a glass transition temperature of >0° C. in the form of an aqueous dispersion.

The coating agent is particularly suitable for manufacturing lacquers for repairs in the motor vehicle sector.

8 Claims, No Drawings

WATER-BASED PHYSICALLY DRYING COATING AGENTS, MANUFACTURE AND USE THEREOF

This application is a continuation of application Ser. No. 07/877,534, filed May 1, 1992, now abandoned.

The invention relates to physically drying water-based coating agents, suitable more particularly for manufacture of single-colour coatings.

Aqueous coating agents are known in the manufacture of base layers of multi-layer coatings. For example, EP-A-0 089 497 describes water-dilutable coating agents based on polyurethane dispersions produced by a known process of building up from polyether and/or polyester diols, diisocyanates, compounds with two groups reacting with isocyanate and at least one anionic group, and di- and/or polyamines. These coating agents, optionally after covering with a coating lacquer, are stoved at elevated temperature, e.g. 130° to 150° C.

In industry and trade, there is also a need for physically drying coating agents suitable particularly for patching the lacquer on various substrates such as metal objects, more particularly in the motor vehicle sector, or for lacquering machines. The coating agents required for this purpose must dry or harden at room temperature or on slight heating, e.g. up to 60° C.

These physically drying coating agents, suitable e.g. for patching the lacquer on motor vehicles, are known e.g. from DE- PS 29 24 632. The known systems, however, are not water-based but based on organic solvents.

The aim of the invention is to provide a water-based physically drying coating agent.

It has been found that this problem can be solved by the subject of the invention, which contains
5 to 30 wt. % of a binder, i.e a mixture of
A) 10 to 90 wt. %, preferably 50 to 90 wt. % of polyurethanes containing one or more carbonate groupings, with a glass transition temperature of $<0°$ C., in the form of an aqueous dispersion, and
B) 10 to 90 wt. %, preferably 10 to 50 wt. % of one or more unsaturated reaction products of carboxy-functional polycondensates and $\alpha$, $\beta$-olefinically unsaturated monomers with a glass transition temperature of $>0°$ C., preferably $>10°$ C., more preferred $>20°$ C., in the form of an aqueous dispersion,
the percentages by weight of components A) and B) each relating to the solids in the binder and adding up to 100 wt. %,
40 to 85 wt. % of water
1 to 20 wt. % of one or more organic solvents,
2 to 25 wt. % of one or more colouring and/or decorative pigments,
neutralising agents for giving a degree of neutralisation of 40 to 120% in the neutralised groups in the binder, and
optional conventional additives and adjuvants,
the binder component
A) being obtainable by reaction of
  a) 10 to 40 wt. % of one or more organic polyisocyanates not containing any hydrophilic groups or groups convertible into hydrophilic groups,
  b) 40 to 80 wt. % of one or more higher-molecular organic polyhydroxyl compounds containing no hydrophilic groups or groups convertible into hydrophilic groups and containing at least 50 wt. % of one or more polyhydroxy polycarbonates,
  c) 0.2 to 18 wt. % of one or more low-molecular compounds containing at least two groups which react with isocyanate groups but not containing any hydrophilic groups or groups convertible into hydrophilic groups,
  d) 0 to 8 wt. % of one or more non-ionic hydrophilic compounds containing at least one isocyanate group or at least one group capable of reacting with isocyanate groups, and
  e) 1 to 12 wt. % of one or more compounds containing at least one ionic group or at least one group convertible into an ionic group and at least one hydrogen atom capable of reacting with isocyanate groups,
and the binder component
B) being obtainable by reacting
  i) 5 to 95 wt. % of a carboxy-functional polycondensate containing additional epoxy groups,
  ii) 95 to 5 wt. % of at least one copolymerisable $\alpha$, $\beta$-olefinically unsaturated monomer, and
  iii) 0 to 20 wt.% of conventional adjuvants for polymer manufacture, the quantitative proportions of components i) to iii) relating to the content of solids in component b) and their sum always being 100 wt. %

Preferably the sum of the glass transition temperatures of the binder components A) and B) is above 0° C., particularly preferably above 20° C.

In the coating agents according to the invention, the binder component A comprises one or more polyurethanes containing carbonate groupings. Optionally these polyurethanes can also contain urea groupings, the resulting substances being polyurethane ureas.

Preferably the polyurethanes used as component A) contain at least 200 milliequivalents per 100 g solids of chemically incorporated —O—CO—O— carbonate groupings. Preferably they contain not more than a total of 320 milliequivalents per 100 g solids of chemically incorporated —NH—CO—O— urethane groupings and optionally chemically incorporated —NH—CO—O— urea groupings. Examples of suitable polyurethanes of this kind are described in German patent application 3936794.0 dated 4 Nov. 1989.

The component A) of the coating agents according to the invention is obtainable by reacting the previously-defined components a), b), c) and optionally d) and e). The component a) is used in a proportion of 10 to 40 wt. %, preferably 15 to 35 wt. %, in each case relating to the solid content of component A). The following are typical examples of organic polyisocyanates which can be used:

multifunctional isocyanates such as aliphatic, cycloaliphatic and/or aromatic polyisocyanates with at least two isocyanate groups per molecule and a molecular weight of 112 to 1000, preferably 140 to 400. The functional groups therein are preferably two isocyanate groups, disposed asymmetrically or symmetrically in the molecule. The isomers or isomer mixtures of organic diisocyanates are preferred. Phenylene diisocyanate, toluylene diisocyanate, xylylene diisocyanate, biphenylene diisocyanate, naphthylene diisocyanate and diphenyl methane diisocyanate are suitable aromatic diisocyanates.

Owing to their good resistance to ultraviolet light, (cyclo) aliphatic diisocyanates yield products with low tendency to yellowing. The following are examples thereof: isophorone diisocyanate, cyclopentylene diisocyanate, and the hydrogenation products of aromatic diisocyanates such as cyclohexylene diisocyanate, methyl cyclohexylene diisocyanate and dicyclohexyl methane diisocyanate. Aliphatic diisocyanate are compounds having the formula

$$O=C=N\text{---}(CR_2)_r\text{---}N=C=O$$

where r is an integer from 2 to 20, preferably 6 to 8 and R, which can be the same or different, denotes hydrogen or a low alkyl radical with 1 to 8 C atoms, preferably 1 or 2 C atoms. The following are examples thereof: trimethylene diisocyanate, tetramethylene diisocyanate, pentamethylene diisocyanate, hexamethylene diisocyanate, propylene diisocyanate, ethyl ethylene diisocyanate, dimethyl ethylene diisocyanate, methyl trimethylene diisocyanate and trimethyl hexane diisocyanate. Isophorone diisocyanate and dicyclohexyl methane diisocyanate are particularly preferred. The polyisocyanate components for forming the prepolymers can also contain a proportion of higher-valency polyisocyanates, provided they are not affected by yellowing. Good results have been obtained with triisocyanate products obtained by trimerisation or oligomerisation of diisocyanates or by reaction of diisocyanates with polyfunctional compounds containing OH or NH groups. These include, for example, the biuret of hexamethylene diisocyanate and water, the isocyanurate of hexamethylene diisocyanate or the adduct of isophorone diisocyanate to trimethylol propane.

The average functionality can optionally be lowered by adding monoisocyanates. Phenyl isocyanate, cyclohexyl isocyanate and stearyl isocyanate are examples of such chain-breaking monoisocyanates.

The component b) used for producing the binder component A) is used in quantities of 40 to 80 wt. %, preferably 45 to 75 wt. %, in each case relating to the total solid content of component A). Component b) preferably comprises organic polyhydroxyl compounds with a molecular weight of 300 to 5000, preferably 500 to 3000, the component b) containing at least 50 wt. %, preferably more than 70 wt. %, of polyhydroxy polycarbonates in this molecular weight range. These structural components essential to the invention include carbonic acid esters obtained by reaction of carbonic acid derivatives such as diphenyl carbonate or phosgene with diols. The following are examples of the aforementioned diols: ethylene glycol, 1,2-propanediol and 1,3-propanediol, 1,4 and 1,3-butanediol, 1,6-hexanediol, 1,8-octanediol, neopentyl glycol, 1,4-bishydroxymethyl cyclohexane, 2-methyl-1,3-propanediol, 2,2,4-trimethyl-1,3,pentanediol, diethylene glycol, tri- and tetraethylene glycol, dipropylene glycol, polypropylene glycols, dibutylene glycol, polybutylene glycols, bisphenol A and tetrabromobisphenol A. Preferably the diol component contains 40 to 100 wt. % hexanediol, preferably 1,6-hexanediol, and/or hexanediol derivatives, preferably those containing terminal OH groups and ether or ester groups, e.g products obtained by reaction of one mol hexanediol with at least 1 mol, preferably 1 to 2 mols, of caprolactone as per DE-AS 17 70 245, or by etherification of hexanediol with itself to form di- or trihexylene glycol. The manufacture of these derivatives is known, e.g. from DE-AS 1 570 540. The polyether polycarbonate diols described in DE-OS 37 17 060 may also very advantageously be used.

The hydroxyl polycarbonates should be basically straight-chain, but if required they can be slightly branched by incorporating polyfunctional components, more particularly low-molecular polyols. Glycerol, trimethylol propane, 1,2,6-hexanetriol, 1,2,4-butanetriol, trimethylol propane, pentaerythritol, quinitol, mannitol, sorbitol, methylglycoside and 1,4,3,6-dianhydrohexitols are examples of suitable substances for this purpose.

In addition to these polyhydroxy polycarbonates, the structural component b) can contain other polyhydroxyl compounds known from polyurethane chemistry and in the aforementioned range of molecular weights, e.g.

1. Dihydroxy polyesters known per se from polyurethane chemistry and obtained from dicarboxylic acids e.g succinic acid, adipic acid, suberic acid, azelaic acid, sebacic acid, phthalic acid, isophthalic acid, terephthalic acid, tetrahydrophthalic acid, etc and diols such as ethylene glycol, 1,2-propanediol, 1,3-propanediol, diethylene glycol, 1,4-butanediol, 1,6-hexanediol, 1,8-octanediol, neopentyl glycol, 2-methyl-1,3-propanediol or the various isomeric bishydroxymethyl cyclohexanes.
2. The polylactones known per se in polyurethane chemistry, e.g. the polymers of $\epsilon$-caprolactone started on the aforementioned divalent alcohols;
3. Polyethers known per se in polyurethane chemistry, e.g polymers or copolymers of tetrahydrofuran produced by using divalent starter molecules such as water or the aforementioned diols or amines containing 2 NH bonds or styrene oxide, propylene oxide, ethylene oxide, butylene oxide or epichlorohydrin, more particularly propylene oxide and optionally ethylene oxide. Proportions of ethylene oxide are optionally also used, but provided the resulting polyether diol does not contain more than 10 wt. % of ethylene oxide units.

Preferably also the polyether diols used are obtained without using ethylene oxide, i.e more particularly by exclusive use of propylene oxide and tetrahydrofuran.

Component c) can optionally be used in the manufacture of the binder component A). If so, it is used preferably in quantities of 0.2 to 18 wt. %, particularly preferably from 0.5 to 10 wt. %, relative to the solid content of component A). The optionally used component c) comprises low-molecular compounds containing at least difunctional hydroxyl and/or amino groups with molecular weights of 60 to 400 and known from polyurethane chemistry. During the addition of isocyanate, they are used as chain-lengthening agents (when using difunctional compounds) or as cross-linking agents (when using trifunctional or multifunctional compounds) and are so constructed that the functional groups are bonded via aliphatic, alicyclic or aromatic radicals. For example, quantities of up to 30 wt. % of the total polyol constituents, preferably about 2 to 20 wt. %, can be used. Examples of suitable low-molecular polyols and polyamines are given hereinafter.

Preferably the low-molecular polyols have up to about 20 carbon atoms in the molecule, e.g ethylene glycol, diethylene glycol, triethylene glycol, 1,2-propanediol, 1,3-propanediol, 1,4-butanediol, 1,2-butylene glycol, 1,6-hexanediol, trimethylol propane, castor oil or hydrogenated castor oil, di-trimethylol propane ether, pentaerythritol, 1,2-cyclohexanediol, 1,4-cyclohexane dimethanol, bisphenol A, bisphenol F, neopentyl glycol, hydroxypivalic acid neopentyl glycol ester, hydroxyethylated or hydroxypropylated bisphenol A, hydrogenated bisphenol A and mixtures thereof.

The polyamines are basically alkylene polyamines with 1 to 30 carbon atoms, preferably about 2 to 12 carbon atoms. They can carry substituents which do not have any hydrogen atoms capable of reacting with isocyanate groups. Polyamines with straight-chain or branched aliphatic, cycloaliphatic or aromatic structure and at least two primary amino groups are examples. The following are examples of diamines: ethylene diamine, propylene diamine, 1,4-butylene diamine, piperazine, 1,4-cyclohexyl dimethyl amine, hexamethylene 1,6-diamine, trimethyl hexamethylene diamine, methane diamine, isophorone diamine, 4,4'-diaminodicyclohexyl methane and aminoethyl ethanolamine. The diamines are preferably alkyl or cycoalkyl diamines such as propylene diamine or 1-amino-3-aminomethyl-3,5,5-trimethyl cyclohexane. The chain can also be extended with hydrazine. In addition to hydrazine, the chains can also be prolonged with substituted hydrazides, e.g monoalkyl or monoaryl hydrazide or bishydrazides, such as adipic acid bis-hydrazide.

The chain can be prolonged at least partly with a polyamine containing at least three amino groups with a reactive hydrogen atom. This type of polyamine can be used in a quantity such that unreacted amino nitrogen atoms with one or two reactive hydrogen atoms are present after prolongation of the polymer. Diethylene triamine, triethylene tetra-amine, dipropylene triamine and dibutylene triamine are examples of such suitable polyamines. The polyamines are preferably alkyl or cycloalkyl triamines, such as diethylene triamine. To prevent gelling during prolongation of the chain, small proportions of monoamines such as ethyl hexyl amine can also be added.

Optionally the component d) can also be used to build up the binder component A). The quantities used are preferably 0 to 8 wt. %, preferably 0.5 to 6 wt. % relative to the solids in component A).

The hydrophilic structural component d) can be a compound containing ethylene oxide units incorporated in polyether chains, e.g.

d1) Diisocyanates and/or difunctional compounds as far as the isocyanate polyaddition reaction is concerned, containing hydrogen atoms reacting with isocyanate groups and with polyether side chains containing ethylene oxide units, or d2) Monoisocyanates and/or compounds which are monofunctional as regards the isocyanate polyaddition reaction and containing hydrogen atoms which react with isocyanate groups and contain polyether chains comprising ethylene oxide units, or mixtures of compounds d1) and d2).

The structural components d1) more particularly contain compounds having the general formula (I)

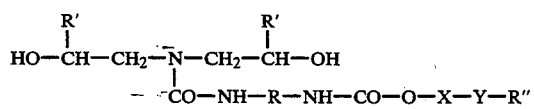

or compounds having the general formula (II)

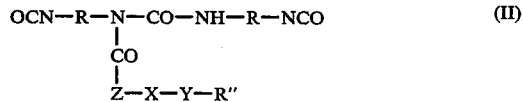

The compounds d2) more particularly contain those having the general formula (III)

or the formula (IV)

and/or compounds having the general formula (V)

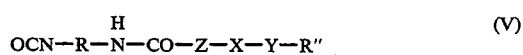

In formulae (I) to (V)
R stands for a divalent radical as obtained by removing the isocyanate groups from a diisocyanate of formula R(NCO)$_2$ of the aforementioned kind (in which case R will correspond to the previously-mentioned radical Q),
R' stands for hydrogen or a monovalent hydrocarbon radical with 1 to 8 carbon atoms, preferably hydrogen or a methyl group,
R" stands for a monovalent hydrocarbon radical with 1 to 12 carbon atoms, preferably an unsubstituted alkyl radical with 1 to 4 carbon atoms,
X stands for the radical obtained by removing the terminal oxygen atom from a polyalkylene oxide chain with 5 to 90, preferably 20 to 70 links, at least 40% and preferably at least 65% of the links consisting of ethylene oxide, and the substances comprising propylene oxide, butylene oxide or styrene oxide units in addition to ethylene oxide units, propylene oxide units being preferred from among the last-mentioned list,
Y stands for oxygen or —NR'"—, where R'" is as per its definition R", and
Z stands for a radical corresponding in meaning to the definition Y.

These hydrophilic structural components (I) to (V) are produced by analogy with U.S. Pat. No. 3,920,598, U.S. Pat. No. 3,905,929, U.S. Pat. No. 4,190,566 or U.S. Pat. No. 4,237,264.

The component e) for producing the binder component A) is used in quantities of 1 to 12 wt. %, preferably 15 to 6 wt. %. The component e) is a compound containing two H-active groups reacting with isocyanate groups and at least one group capable of forming anions. Hydroxyl groups and primary and/secondary amino groups are suitable for reacting with isocyanate groups. Carboxyl, sulphonic acid and/or phosphonic acid groups are capable of forming anions. Preferably carboxylic acid or carboxylate groups are used. They should be sufficiently inert for the isocyanate groups of the diisocyanate to react preferably with the hydroxyl groups of the molecule. Preferably alkanoic acids with two substituents on the carbon atom at α are used. The substituent can be a hydroxyl group, an alkyl group or an alkylol group. These polyols have at least one, usually one to three, carboxyl groups in the molecule. They have two to about 25, preferably 3 to 10 carbon atoms. Dihydroxyproprionic acid, dihydroxy succinic acid and dihydroxy benzoic acid are examples of such compounds. One particularly preferred group of dihydroxy alkanoic acids comprises α,α-dimethylol alkanoic acids, characterised by the structural formula

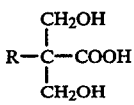

where R denotes hydrogen or an alkyl group with up to about 20 carbon atoms. 2,2-dimethylol acetic acid, 2,2-dimethylol propionic acid, 2,2-dimethylol butyric acid and 2,2-dimethylol pentanoic acid are examples of such compounds. The preferred dihydroxyalkanoic acid is 2,2-dimethylol propionic acid. The following are examples of compounds containing amino groups: α,δ-diaminovalerianic acid, 3,4-diaminobenzoic acid, 2,4-diaminotoluene sulphonic acid, and 2,4-diamino-diphenyl ether sulphonic acid. The polyol containing carboxyl groups can make up 3 to 100 wt. %, preferably 5 to 50 wt. % of the total polyol constituent in the NCO prepolymer.

The amount of ionisable carboxyl groups available in salt form by neutralisation of the carboxyl groups:

is usually at least 0.4 wt. %, preferably at least 0.17 wt. % relative to the solids. The upper limit is about 6 wt. %. The object of dihydroxyalkanoic acids in the non-neutralised prepolymer gives an acid number of at least 5, preferably at least 10. The upper limit of the acid number is about 60, preferably 40 relative to solids.

The quantity of component e) and the degree of neutralisation of the ionic groups incorporated with component e) is made such that the finally obtained polyurethane contains 0 to 120, preferably 1 to 80 milliequivalents of ionic groups per 100 g solids, the total quantity of ethylene oxide units and ionic groups within the stated ranges being such as to ensure that the polyurethane polyureas are dispersible in water.

The component A) used in the binder according to the invention has a glass transition temperature of <0° C., preferably <−10° C., more preferred <−20° C.

The polyurethane or polyurethane urea dispersions of component A) can be manufactured by reacting the polyisocyanates, preferably diisocyanates, with polyols having various molecular weights, preferably diols, with simultaneous incorporation of ionic and/or nonionic hydrophilic groups in a part of these diols or diamines, preferably diols. The starting components can be reacted in one or more stages, in mixed or sequenced succession.

In the reaction of the starting components a) to e) a solvent inert towards isocyanate groups and miscible with water can optionally be used, so that the reaction products are finally in the form of a colloidal solution in an aforementioned solvent. In this connection "solution" means both a true solution and a water-in-oil emulsion, which may be produced e.g. if some of the structural components are in the form of aqueous solutions. The following are examples of suitable solvents: acetone, methyl ethyl ketone, N-methyl pyrrolidone or any mixtures of these solvents. The amount of solvent is usually such that 10 to 70 wt. % solutions of the reaction products are obtained from the starting components a) to e) in the solvent.

When polyurethane polyureas are produced in one stage, the starting components are preferably mixed with groups capable of reacting with isocyanate groups and reacted with the starting components having isocyanate groups, preferably initially in the absence of solvents and at temperatures at 50° to 150° C., optionally with known catalysts. Preferably the nature and proportions of the starting compounds are chosen to obtain an equivalent ratio of isocyanate groups to groups reacting with isocyanate groups of 0.8:1 to 1.05:1.

During the reaction the viscosity of the mixture increases, so that one of the aforementioned solvents is gradually added to the mixture. Finally an organic solution of the completely reacted polyurethane is obtained, the concentration being adjusted to about 10 to 70, particularly 15 to 55 wt. % solids.

In the preferred two-stage process, preferably an NCO prepolymer is first produced in the melt of starting components a) and optionally d) containing excess quantities of isocyanate groups and starting components b), c), e) and optionally d) containing hydroxyl groups, maintaining an NCO—OH equivalent ratio of 1.1:1 to 3.5:1, preferably 1.2:1 to 2.5:1 in the presence or absence of a solvent of the aforementioned kind at about 50° to 150° C., the NCO polymer being subsequently absorbed in a solvent of the aforementioned kind, if solvents have been absent. The resulting solution is then reacted with other chain-prolonging or cross-linking agents c), optionally in the form of aqueous solutions, the components c) preferably being structural components of the kind mentioned hereinbefore by way of example and containing primary and/or secondary amino groups. The amount of structural components c) used in this second stage is made such that the equivalence ratio of all starting compounds used in the first and second stage corresponds to the previously-given information.

In both variants (single-stage or two-stage), the resulting solutions of the reaction products in the aforementioned solution have a content of solids within the aforementioned ranges.

At least partial conversion of optional potential ionic groups into ionic groups by quaternisation or neutralisation is advantageously brought about before the dispersing water is added. In the preferred case where structural components e) comprising carboxyl groups are used, particularly dimethylol propionic acid, the neutralising agents are preferably tertiary amines. The neutralisation agent is added either in the form of the salt, e.g. the dimethylol propionic acid salt, or after the production of the isocyanate prepolymer. Examples of such tertiary amines are triethylamine, tri-n-butylamine, N,N,N-trimethyl cyclohexylamine, N-methyl morpholine, N-methyl piperazine, N,N-dimethyl ethanolamine, N-methyl piperidine or triethanolamine. It is also preferable, under the conditions set out in EP-A-269 972, to use ammonia as a neutralisation agent for previously-incorporated carboxyl groups.

After the water serving as a solvent or dispersing medium has been added, the amount usually being such that 10 to 60, preferably 20 to 45 wt. % dispersions are obtained, at least the major proportion of the auxiliary solvent is optionally removed by distillation.

The polyurethane polyureas can also be manufactured by other variants in the prior art, e.g. by using hydrazine or diamine in blocked form, i.e. in the form of the corresponding azines or ketimines, as the chain-prolonging agent c), as taught in U.S. Pat. No. 4,269,748 or U.S. Pat. No. 4,829,122.

In addition the "prepolymer mixing process" can be used (see D. Dieterich, Angew, Makromol, Chem, 98, 142 (1981)), an NCO prepolymer first being produced in the previously-described manner and then being mixed with water to form an emulsion, after at least partial conversion of any potential ionic groups into ionic groups. The NCO groups of the prepolymer are then reacted in the aqueous phase, by adding amine chain-prolonging or cross-linking agents c) and/or by reaction with water.

The binder component B) used in the coating agents according to the invention is preferably an acrylated polyester The term 'acrylated polyesters', as described in DE-A-28 11 913, DE-A-33 01 729 and DE-A-35 44 337, means reaction products which can be produced by radical emulsion polymerisation of copolymerisable α,β-unsaturated monomers in the presence of straight-chain or branched carboxy-functional polyesters, which optionally also contain epoxy groups.

Component B) can be manufactured by radical emulsion polymerisation of i) 5 to 95 wt. % of a carboxy-functional polymer in the form of an aqueous system with ii) 95 to 5 wt. % of at least one copolymerisable α,β-olefinically unsaturated monomer in the presence of iii) 0 to 20 wt. % of anionic or non-anionic emulsifier or a mixture of the two, or of protective colloids, relative to the solid content of components i) to iii), with addition of 0.01 to 10 wt.% of at least one polymerisation initiator relative to the monomer content ii) in the presence of other conventional additives and at a temperature of 0° to 150° C., preferably over 20° C. and under 90° C.

The properties of the polymer can be adjusted within wide limits by choosing suitable starting substances. For example, polymers soluble in water or dispersible in water can be obtained by polymerisation of vinyl monomers, not having a cross-linking effect, in an aqueous dispersion or solution of a non cross-linked self-hardening carboxy-functional polymer. The hydrophilic or the hydrophobic properties and the hardness or flexibility can be adjusted by suitable choice of components i) and ii) in desired manner. Also, reactive vinyl monomers can be incorporated so at first to produce polymers which are dispersible in water and are then converted into the cross-linked state by suitable after-treatment, preferably after being applied to a substrate.

Suitable polycondensates (component i) are obtained in the melt or in an azeotropic condensation process by reacting polycarboxylic acids and polyalcohols, optionally with addition of saturated or unsaturated fatty acids (oils) and/or epoxy compounds at temperatures of 150° to 260° C. They have an acid number such that they can be dispersed in stable manner after neutralisation in water.

The polyfunctional carboxylic acids used are straight-chain or branched aliphatic, cycloaliphatic and/or aromatic polybasic carboxylic acids, preferably di-, tri- or tetracarboxylic acids with 4 to 12 carbon atoms per molecule or derivatives thereof capable of esterification, such as anhydrides or methanol esters. In addition to the dicarboxylic acids mentioned in connection with the OH polyesters used for producing polyurethane ester resins, the following are examples of substances used: phthalic acid anhydride, tetrahydrophthalic acid anhydride, tricarboxylic acids such as trimellitic acid anhydride or maleic acid adducts to an isolated or conjugated unsaturated fatty acid or a tetracarboxylic acid such as pyromellitic acid dianhydride or bis-anhydrides produced from trimellitic acid anhydride and dialkanols. In order to adjust the functionality and hardness, the polyesters, optionally oil-free, advantageously also contain small quantities of monobasic acids such as benzoic acid, tert-butyl benzoic acid, or abietic acid. Alternatively carboxylic acids containing hydroxyl groups, such as 5-hydroxypentanoic carboxylic acid or its lactone, dimethylol propionic acid, salicylic acid, tartaric acid or cyclohexanol monocarboxylic acid can be incorporated into esters.

The polyfunctional alcohols are preferably straight-chain or branched aliphatic, cycloaliphatic and/or araliphatic alcohols with 2 to 6, preferably 2 to 4 hydroxyl groups bonded to non-aromatic carbon atoms and 2 to 4 carbon atoms per molecule. Glycols and dialkanols as already used for OH polyesters of the paste resin are examples of such polyalcohols. In order to increase the functionality and introduce branching, trivalent or higher-valency polyalcohols are used, e.g. glycerol, trimethylol propane, di- or trimethylol propane ether, trimethylol ether, pentaerythritol, dipentaerythritol, 1,2,6-hexanetriol or trishydroxyethyl isocyanurate. The aforementioned polyalcohols can be substituted in small quantities by monovalent alcohols. The selection of the alcohol component will depend inter alia on the desired content of free hydroxyl groups, the quantity of monocarboxylic acid used and the desired solubility and ease of dilution. The polymers can optionally be partially urethanised with mono- or diisocyanates.

To obtain the desired solubility in water, the manufacture of the resins can be stopped when the desired degree of condensation is reached or, more advantageously, a higher-molecular polyester containing OH groups is reacted with acid anhydrides, preferably cycloaliphatic acid anhydrides. A similar effect is obtained by reaction with bis-anhydrides, trimellitic acid anhydride, trimellitic acid monoalkyl esters or maleic acid anhydride adducts to isolated or conjugated unsaturated fatty acids. Another advantageous method is to lower the acid number of a strongly acid polyester precondensate by at least partial reaction with compounds containing epoxy groups, such as the glycidyl ester of versatic acid (Cardura ® E-10), epoxydated linseed oil or soya oil or polyglycidyl ethers. The OH polymer is preferably a reaction product with an average molecular weight (Mn) of advantageously 2000 to 100000 (Gel chromatography against polystyrene standard) and a preferred acid number of 5 to 150, relative to solid resin, and consisting of a) a polymer or copolymer with a hydroxyl number of 20 to 300, preferably over 40 and under 200, or particularly over 50 and under 130, relative to solid resin, b) a polycarboxylic acid anhydride mixture containing trimellitic acid units and with an acid number of 10 to 1000, preferably over 100 and under 800, obtained by reacting trimellitic acid anhydride with preferably divalent alcohols, and c) epoxidised oils with epoxy numbers from 1 to 50, preferably over 2 and under 25, or particularly over 3 and under 15, the equivalent ratio of carboxyl groups to epoxy groups being 3:1 to 1:3, preferably 1.25:1 to 1:1.25 and the solids ratio of bis-anhydride b) to OH polymer a) being between 50:50 and 10:90, preferably 40:60 to 15:85.

The resulting polyesters (component i)) are used, preferably after neutralisation, to obtain an aqueous dispersion in which a mixture of unsaturated monomers (component ii)) is polymerised. To obtain the best conditions for emulsion polymerisation, however, additional water is added to the current polymerisation batch.

The $\alpha,\beta$-unsaturated monomers can be practically all radically polymerisable monomers, subject to the copolymerisation parameters and the normal restrictions regarding copolymerisation, as given by the Q and e scheme of Alfrey and Price. The unsaturated monomers not containing any other reactive groups are selected in accordance with the mechanical properties and compatibility.

The following are examples of $\alpha,\beta$-olefinically unsaturated monomers (component ii)): (meth)acrylate monomers such as methyl(meth)acrylate, ethyl(meth)acrylate, propyl(meth)acrylate, the various isomeric butyl(meth)acrylates, isomeric octyl(meth)acrylates, e.g. 2-ethylhexyl (meth)acrylate, (meth)acrylamide, N-methylol(meth) acrylamide, (meth)acrylnitrile or (meth)acrylic acid itself, vinyl aromatic monomers such as styrene, $\alpha$-methylstyrene, vinyl toluene, vinyl pyridine, vinyl ester monomers such as vinyl acetate, vinyl esters of branched ($C_9$-$C_{12}$)-carboxylic acids such as versatic acid vinyl ester; linoleic acid vinyl ester, esters, semiesters, amides, and semiamides of $\alpha,\beta$-ethylenically unsaturated mono and dicarboxylic acids such as crotonic acid, maleic acid, fumaric acid, sorbic acid, monomers of unsaturated halogen compounds such as vinyl chloride, vinylidene chloride, (meth)acrylic esters of partly and/or completely fluorinated alcohols corresponding to the general formula

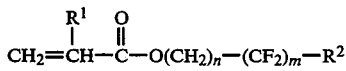

$$CH_2=CH-\overset{R^1}{\underset{|}{C}}-\overset{O}{\underset{\|}{C}}-O(CH_2)_n-(CF_2)_m-R^2$$

with $R^1$=H, $CH_3$; $R^2$=H, F, n=0–10 and m=0–25, hexafluoropropylene, perfluorohexyl ethylene, 2-hydroperfluoroethyl allyl ether and 2-hydroperfluoro propyl allyl ether, monomers such as repeatedly, preferably twice to three times ethylenically unsaturated compounds such as divinyl benzene, ethanediol di(meth)acrylate, propanediol di(meth) acrylate, butanediol di(meth)acrylate, hexanediol di(meth)acrylate, glycerol tri(meth)acrylate, pentaerythritol tri(meth)acrylate and diallyl phthalate.

If multi-ethylenically unsaturated monomers are used, the quantity is usually 0.01 to 20 wt. % relative to the total quantity of monomers ii).

Alternatively monomers with functional groups can be used, e.g. with chemical groupings which will result in cross-linking in the lacquer when applied, e.g carboxylic acid, sulpho acid, hydroxy, amino, amido, keto, aldehyde, lactam, lactone, isocyanate and epoxy groups. Monomers capable of condensation or copolymerisation and bearing the aforementioned functional groupings are known. The use of hydrophilic monomers for polymerisation according to the invention is possible but not generally necessary.

Examples of monomers bearing carboxylic acid groupings are: $\alpha,\beta$-ethylenically unsaturated mono or dicarboxylic acids such as crotonic acid, sorbic acid, itaconic acid, fumaric acid, maleic acid, maleic acid semiesters or the semiesters of itaconic and fumaric acid, preferably acrylic and methacrylic acid.

Examples of unsaturated monomers bearing epoxy groups suitable for cross-linking are: unsaturated glycidyl esters or ethers, e.g glycidyl methacrylate, glycidyl acrylate, allyl glycidyl ether, alkyl glycidyl(meth)acrylate, e.g methyl glycidyl(meth)acrylate, glycidyl or alkyl glycidyl(meth) acrylamide or a monoalkyl glycidyl fumaric acid ester such as monobutyl glycidyl fumaric acid ester.

The copolymerisable monomers may also be monomers with blocked isocyanate groups, e.g isocyanatoethyl(meth)acrylate, blocked e.g with caprolactam or amino alkyl compounds such as dimethyl aminoethyl(meth)acrylate and tert. butyl aminoethyl (meth)acrylate, N-alkoxyalkyl amides, such as methoxy or ethoxymethyl(meth)acrylamide, hydroxyalkyl esters, such as hydroxyethyl and hydroxypropyl(meth)acrylate, or the corresponding compounds of the aforementioned (meth)acrylic acid derivatives of other ethylenically unsaturated acids such as maleic, fumaric, itaconic, crotonic or sorbic acid.

The proportions of i) and ii) can vary within wide limits, depending on whether soft or hard, optionally flexible, polymerisation properties are required. Preferably 10 to 90 wt. % of component i) is reacted with 90 to 10 wt. % of monomers ii), the proportions relating to the total content of solids in the components.

Preferably the dispersion copolymers contain the following in the form of monomer units relative to the amount of component ii): up to 100 wt. % methyl methacrylate and/or n-butyl acrylate, 0 to 20 wt. % hydroxyethyl methacrylate, 0 to 20 wt. % glycidyl methacrylate and 0 to 20 wt. % acrylic acid and/or methacrylic acid, the sum of the monomer units always being 100%. Particularly preferably, the mixture contains 15 to 80 wt. % methyl methacrylate, 15 to 50 wt. % n-butyl acrylate, 0 to 15 wt. % hydroxyethyl methacrylate, 0 to 15 wt. % glycidyl methacrylate and 0 to 5 wt. % acrylic acid and/or methacrylic acid as monomer units.

The dispersion B) is produced by emulsion polymerisation in an aqueous medium at temperatures in the range from 0° to 150° C., preferably 20° to 100° C., particularly 40° to 90° C., optionally under pressure. The component i) is e.g in the form of a 5 to 65 wt. % aqueous system and is then polymerised with the vinyl-polymers ii) with addition of a polymerisation initiator and optional other conventional additives such as emulsifiers and/or protective colloids or molecular weight adjusters. The aqueous medium in the polymerisation batch can come from the aqueous systems of component i), but usually water is added to obtain the best conditions for emulsion polymerisation.

Polymerisation can be carried out as described in DE-OS 28 11 913.

Conventional adjuvants are optionally used for polymerisation, e.g conventional polymerisation initiators, emulsifiers and/or protective colloids and/or conventional molecular-weight adjusters.

The aforementioned polymer or binder dispersions are physically drying. They dry at low temperatures. But it is possible to add cross-linking agents with suitable functional groups to achieve an external cross-linking e.g. during forced drying, heating or stoving. They can also contain functional groups to achieve self-cross-linking.

The coating agents according to the invention contain 5 to 30 wt. % relative to the total coating agent, of the binder containing components A) and B).

The water content of the coating agents according to the invention is 40 to 85 wt. %, preferably 55 to 80 wt. %, in each case relative to the total amount of binder. The water content depends on the particular conditions of sale or of the form of application. For example the water content can be up to 70 wt. % and can be increased before application to up to 85 wt. %.

In order to improve the flow properties, the coating agent according to the invention can contain 1 to 20 wt. %, preferably 8 to 15 wt. %, in each case relative to the total coating agent, of one or more solvents. The solvents can be organic solvents as conventionally used in the lacquer sector, e.g. lacquer solvents and/or additives to aqueous coating agents. For example, aromatic solvents are suitable, such as xylene, esters such as butyl acetate, or ethers such as ethylene glycol monobutyl ether (butyl glycol).

The coating agents according to the invention are particularly suitable for producing single-colour coatings. Optionally, however, they may also be used with metallic pigments, depending on the formulation.

The coating agents according to the invention contain one or more pigments. These are present in quantities of 2 to 25 wt. %, preferably 5 to 20 wt. % relative to the total coating agent. The pigments can be covering, transparent or decorative pigments. They can be soluble or insoluble conventional inorganic and organic pigments, including white pigments such as titanium dioxide. The decorative pigments can e.g. be pearlescent pigments such as iriodine pigments. The pigments also include conventional inorganic or organic fillers as known to the skilled addressee in the lacquer sector. Pigments can be used in a conventional ground-resin ground form.

The coating agents according to the invention contain neutralising agents for partly or completely neutralising the neutralisable groups. The degree of neutralisation of the neutralisable groups is preferably 40 to 120% of the neutralisable groups and is preferably below 100%.

The neutralisation agents for acid groups can be the bases conventionally used in the lacquer sector, such as the previously-mentioned amines, ammonia or alkanolamines, such as N,N-dimethyl ethanolamine.

Optionally the coating agents according to the invention contain conventional additives and adjuvants as used in the lacquer sector. Examples of such additives and adjuvants are thickeners, admixtures influencing the flow properties, anti-foaming agents or corrosion inhibitors (e.g for inhibiting the gassing of metal pigments: Al-gassing). The additives and adjuvants are used in conventional quantities, known to the skilled addressee, depending on the desired effect.

For the purpose of manufacture, the components of the coating agents are mixed in the desired proportions.

The coatings according to the invention can be applied to various substrates by conventional methods, e.g by spraying, spreading or doctor blade. The substrates can be various materials such as metals, plastics, or wood, glass or other substrates. The coating agents according to the invention are particularly suitable for producing single-colour coatings.

The coating agents according to the invention are physically drying, i.e. they do not need storing and can be dried e.g. at temperatures of about 20° to 60° C., preferably about 20° to 40° C. The achieved coatings are not tacky.

The coating agents according to the invention are particularly suitable for producing single-colour coatings. The characteristics of such coating agents differ from those of coating agents for metallic coatings. It is necessary that coating agent for single-coloured coats can be highly pigmented; they have to provide good mechanical, chemical and optical effects such as high hardness, good elasticity, resistance against water and gloss, even if thick Layers are applied. Single-coloured layers achievable in accordance with the present invention have a thickness in the order of 20 to 50 μm. The ratio of binder and pigment is in the order of 10:1 to 1:2 (referring to the weight of the solids content).

The coating agents according to the invention, after being applied, can be coated with covering lacquers, more particularly transparent covering lacquers. The covering lacquers can be applied wet-in-wet, after brief ventilation or after drying the base layer of lacquer applied according to the invention. The covering layer can be dried at the same time as the layer of coating agent according to the invention. The covering lacquer can be a conventional, more particularly transparent, lacquer, e.g. of the kind conventionally uesd in the car sector. The lacquers are mainly solvent-based, but water-based covering lacquers can be used.

As already mentioned, the coating agents according to the invention can be applied to a wide variety of substrates. They are particularly suitable for producing single-colour base layers in multilayer composite lacquers. The preferred application is to lacquering of motor vehicles or parts thereof. As a result of the advantageous physical drying, the coating agents according to the invention are particularly suitable as repair or patching lacquers.

The following examples illustrate the invention:

EXAMPLE OF MANUFACTURE 1

Polyurethane-polyurea Dispersion A 850 parts of a polycarbonate from 1,6-hexanediol (prepared by reaction of 1,6-hexanediol and diphenyl carbonate; hydroxyl number 56, molecular weight about 2000), 67.5 parts of a monofunctional polyether alcohol, OH number 26, prepared by alkoxylation of n-butanol using a mixture of 83% ethylene oxide and 17% propylene oxide, 21.4 parts of 2,2-bishydroxymethyl propionic acid (DMPS) and 22.5 parts of 1,4-butanediol were reacted at 100° C. with a mixture of 151.2 parts of 1,6-diisocyanatohexane (HDI) and 199.8 parts of 3-isocyanatomethyl-3,5,5-trimethylcyclohexyl isocyanate (IPDI), yielding a prepolymer containing about 5% of free isocyanate groups. The prepolymer was dissolved in 2440 parts of acetone and the solution was cooled to 50° C.

A solution of 19.8 parts ethylene diamine and 7.5 parts hydrazine hydrate was prepared in 500 parts of water. The solution was slowly added, with vigorous agitation, to the prepolymer solution, producing a thinly liquid cloudy white solution. Next, 13.4 parts of N,N-dimethyl ethanolamine were added. 1525 parts of deionised water were then added with vigorous agitation, resulting in an opaque blue-white dispersion of the solids. The acetone was removed from the dispersion by distillation in vacuo, leaving a pure aqueous dispersion containing 40% solids.

The solids in the dispersion contain the following:

(mEq-%=milliequivalent % per 100 g solids).
410 mEq-% carbonate groups (—O—CO—O—)
148 mEq-% urethane groups (—NH—CO—O—)
95 mEq-% urea groups (—NH—CO—NH—)
243 mEq-% urethane and urea groups

EXAMPLE OF MANUFACTURE 2

Manufacture of Component B 100 g of an anhydride mixture (SZ/H$_2$O=486), manufactured by reacting trimellitic acid anhydride with 1,2-propane diol, i.e. consisting of trimellitic acid anhydride and anhydride having the following formulae I and II

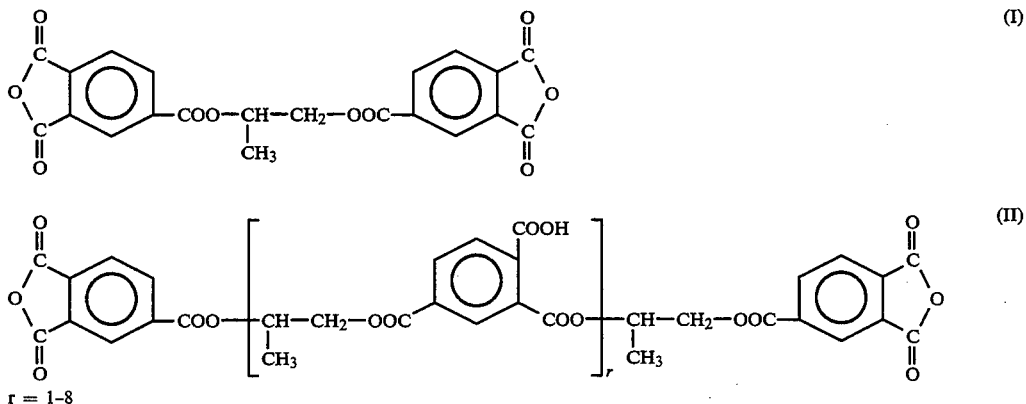

r = 1-8 and homogenised in 108 g xylene at 50° C., were added dropwise in one hour to a solution of 141 g of a polyester (OHZ=88), manufactured on the basis of phthalic acid anhydride, isophthalic acid, maleic acid anhydride, propanol and glycerol, as described in DE-OS 28 11 913, in 70 g methyl ethyl ketone. At 90° C. the mixture was agitated until the acid number in water was 165 (100% resin). Next, 12 g of water was added and, after 6 hours agitation at 80° to 90° C., the acid number in butanol was 168 (100% resin). The temperature of the mixture was lowered to 60° C. and, after adding 0.3 lithium benzoate, 132 g of an epoxidised linseed oil (epoxy number=8.7) was added dropwise in 2 hours and the mixture was agitated until the acid number in butanol had fallen to 86.5. Next, a mixture of 42 g dimethylamine (60% in water) in 860 g water was stirred in. The result was a light yellow opalescent solution, from which the organic solvent was distilled off at 0.1 bar and 40° C. After filtration, a yellowish, practically clear aqueous resin solution was obtained.

Content of solids: about 32% (1 hour at 125° C.).

705 g of the aforementioned aqueous (32%) dispersion and 196 g of water was poured into a reactor equipped with an agitator, reflux condenser, internal thermometer and metering device for the monomers, and the initiator. The mixture was heated to 80° C. with agitation, and a solution of 0.5 g ammonium peroxydisulphate in 35 g water was added. 5 minutes after adding the initiator, 35 g of a monomer mixture of 125 g methyl methacrylate, 94 g n-butyl acrylate and 17 g glycidyl methacrylate was added, and after a further 15 minutes of pre- polymerisation, the remaining amount of monomers was gradually added over 2 hours. 10 minutes after the addition process, a further 0.2 g of ammonium peroxydisulphate, dissolved in 10 g water, was added within 10 minutes and the batch was agitated at 80° C. for a further 2 hours to obtain complete conversion.

The result was a stable aqueous dispersion containing about 40% solids.

EXAMPLE OF MANUFACTURE 3

Manufacture of Single-coloured Water-based Lacquers

The previously-produced dispersions A to C were used to obtain aqueous metallic-based lacquers containing the following constituents:

35.5*) parts of dispersions A and B
21.1*) parts water
12.1 parts butyl glycol
1.3 parts of a commercial thickener
0.14 parts of N,N,dimethyl ethanolamine
22.1 parts of a commercial titanium dioxide pigment
0.5 parts of a commercial copper phthalocyanine pigment
0.16 parts of a commercial foam-breaking agent, and
8.1 parts of a commercial PU grinding adjuvant. (FK 30%)

x) each dispersion contained about 40% solids (FK); when the FK was lower, the amounts of dispersion and water were suitably adjusted, so as to obtain coating materials ready for use and with the same FK content in each case.

The resulting single-colour base lacquers had a viscosity of about 40–50 sec. (DIN beaker 4 mm nozzle, 23° C.) and were diluted with about 10–15% water to obtain a spray viscosity of about 20 sec.

The dispersions were used to obtain the following lacquer coatings:

Structure of lacquer coating on metal sheets under examination:
  Smooth-ground car-body metal
  Conventional 2K epoxy adhesive primer
  Conventional 2K-PU filler
  Water-based lacquer
  Conventional 2K-PU clear lacquer, medium solid type, FK 47%

Application and drying of the layer of covering lacquer (base lacquer+clear lacquer):
  Spraying of water base lacquer as listed in Examples 1 to 3 in the following table.
  40 minutes pre-drying at room temperature
  Spraying of clear lacquer
  10 minutes ventilation at room temperature
  45 minutes drying at 60° C.

Explanations:
  parts=parts by weight
  2K=two components
  PU=polyurethane

The properties of the resulting lacquer coatings are shown in the following table:

| | Comparative test on single-colour base lacquers | | | |
|---|---|---|---|---|
| Example | Binder | Hardness before/after F/W | Adhesion before/after F/W | Filling/gloss after F/W |
| 1 | dispersion: component A | 2/3-4 | 1/2-3 | 3 |
| 2. | dispersion: component B | 2-3/4 | 2-3/3 | 3 |
| 3. | mixture of components A + B according to the invention | 1-2/2- | 1/2 | 2- |

F/W = resistance to water of condensation DIN 50017 KK 72 h
Adhesion: Grid method, DIN 53151
Marks:
1 = very good,
2 = good,
3 = of limited use,
4 = useless

We claim:

1. A physically drying water-based coating containing:
   5 to 30 wt. % of a binder comprising:
   A) 10 to 90 wt. % of polyurethanes containing one or more carbonate groupings, with a glass transition temperature of <0° C., in the form of an aqueous dispersion, and
   wherein the binder component
   A) is the reaction product of:
      a) 10 to 40 wt. % of one or more organic polyisocyanates not containing any hydrophilic groups or groups convertible into hydrophilic groups,
      b) 40 to 80 wt. % of one or more high-molecular organic polyhydroxyl compounds not containing any hydrophilic groups or groups convertible into hydrophilic groups and containing at least 50 wt % of one or more polyhydroxy polycarbonates,
      c) 0.2 to 18 wt. % of one or more low-molecular compounds containing at least two groups capable of reacting with isocyanate groups but not containing any hydrophilic groups or groups convertible into hydrophilic groups,
      d) 0 to 8 wt. % of one more more non-ionic hydrophilic compounds containing at least one isocyanate group or at least one group capable of reacting with isocyanate groups, and
      e) 1 to 12 wt. % of one or more compounds containing at least one ionic group or at least convertible into an ionic group and at least one hydrogen atom capable of reacting with isocyanate groups,
   B) 10 to 90 wt. % of one more more reaction products of carboxy-functional polycondensates and α,β-olefinically unsaturated monomers with a glass transition temperature of 0° C. in the form of an aqueous dispersion,
   wherein the binder component
   B) is the reaction product of:
      i) 5 to 95 wt. % of a carboxy-functional polycondensate containing additional epoxy groups,
      ii) 95 to 5 wt. % of at least one copolymerisable α,β-olefinically unsaturated monomer, and
      iii) 0 to 20 wt. % of adjuvants for polymer manufacture, the quantitative proportions of compounds i) to iii) relating to the content of solids in component b) and their sum always being 100 wt. %
   the percentages by weight of components A) and B) referring in each case to the solids in the binder and adding up to 100 wt. %,
   40 to 85 wt % water,
   1 to 20 wt. % of one or more organic solvents,
   2 to 25 wt. % of one or more colouring and/or decorative pigments, and
   neutralisation agents in an amount of from 40 to 120% of the neutralisable groups in the binder.

2. A physically drying coating agent according to claim 1, in which the component B iii) consists of anionic and/or non-anionic emulsifiers and/or protective colloids.

3. A physically drying coating agent according to claim 1, in which the binder component A) comprises one or more polyurethane ureas.

4. A method of producing a coating agent according to claim 1, characterised in that the components mentioned in claim 1 are mixed in the proportions set forth in claim 1, the colouring pigment optionally being introduced in ground form.

5. A method of coating a motor vehicle surface which comprises applying a drying coating surface composition according to claim 1 as a multi-layer lacquer coating.

6. A method for coating a motor vehicle surface according to claim 5 wherein the surface is a motor vehicle surface sector.

7. A method for coating a motor vehicle surface according to claim 5 wherein the surface comprising applying a single-colour lacquer coating of said composition to said surface for repair purposes.

8. A method for producing a physically drying water-based coating agent, characterised in that a binder component A) in the form of polyurethanes containing one or more carbonate groupings and having a glass transition temperature of <0° C. in the form of an aqueous dispersion produced by reacting:
   a) 10 to 40 wt. % of one or more organic polyisocyanates not containing any hydrophilic groups or groups convertible into hydrophilic groups,
   b) 40 to 80 wt. % of one or more higher-molecular organic polyhydroxyl compounds not containing any hydrophilic groups or groups convertible into hydrophilic groups and containing at least 50 wt. % of one or more polyhydroxy polycarbonates, c) 0.2 to 18 wt. % of one or more low-molecular compounds containing at least two groups capable of reacting with isocyanate groups but not containing any hydrophilic groups or groups convertible into hydrophilic groups, d) 0 to 8 wt. % of one or more non-ionic hydrophilic compounds containing at least one isocyanate group or at least one group capable of reacting with isocyanate groups, and e) 1 to 12 wt. % of one or more compounds containing at least one ionic group or at least one group convertible into an ionic group and at least one hydrogen atom capable of reacting with isocyanate groups, is admixed with a binder component B) produced by reacting carboxy-functional polycondensates and $\alpha,\beta$-olefinically unsaturated monomers and having a glass transition temperature of $>0°$ C. and in the form of an aqueous dispersion produced by the reaction of:

i) 5 to 95 wt. % of a carboxy-functional polycondensate containing additional epoxy groups, ii) 95 to 5 wt. % of at least one copolymerisable $\alpha,\beta$-olefinically unsaturated monomers, and iii) 0 to 20 wt. % of adjuvants for polymer manufacture, the quantitative proportions of components i) to iii) relating to the content of solids in component b) and their sum always being 100 wt. %, and 10 to 90 wt. % of component A) being mixed with 10 to 90 wt. % of component B), the percentage weights of components A) and B) referring to each case to the solids in the binder and adding up to 100 wt. %, and 5 to 30 wt. % of mixture of binders A) and B) is mixed with 40 to 85 wt. % water, 1 to 20 wt. % of one or more organic solvents, 2 to 25 wt. % of one or more colouring and/or decorative pigments, and a neutralising agent in an amount of from 40 to 120% in the neutralizable groups in the binder.

* * * * *

UNITED STATES PATENT AND TRADEMARK OFFICE
CERTIFICATE OF CORRECTION

PATENT NO. : 5,401,795
DATED : March 28, 1995
INVENTOR(S) : Thomas Brock et al.

It is certified that error appears in the above-indentified patent and that said Letters Patent is hereby corrected as shown below:

Column 17, line 45, change "more" (first occurrence) to --or--.

Column 17, line 55, change "more" (first occurrence) to --or--.

Column 18, line 22, after the "%" sign, change the period to a comma.

Column 18, line 52, change "comprising" to --comprises--.

Column 20, line 4, change "monomers" to --momomer--.

Column 20, line 12, change "referring to" to --referring in--.

Signed and Sealed this

Fourth Day of July, 1995

Attest:

BRUCE LEHMAN

Attesting Officer     Commissioner of Patents and Trademarks